US012283285B2

(12) United States Patent
Chen et al.

(10) Patent No.: US 12,283,285 B2
(45) Date of Patent: Apr. 22, 2025

(54) AUTOMATIC GAIN CONTROL METHOD AND DEVICE, AND READABLE STORAGE MEDIUM

(71) Applicant: SOUNDAI TECHNOLOGY CO., LTD., Beijing (CN)

(72) Inventors: Xiaoliang Chen, Beijing (CN); Dahang Feng, Beijing (CN)

(73) Assignee: SOUNDAI TECHNOLOGY CO., LTD., Beijing (CN)

( * ) Notice: Subject to any disclaimer, the term of this patent is extended or adjusted under 35 U.S.C. 154(b) by 347 days.

(21) Appl. No.: 17/606,950

(22) PCT Filed: Oct. 31, 2019

(86) PCT No.: PCT/CN2019/114764

§ 371 (c)(1),
(2) Date: Oct. 27, 2021

(87) PCT Pub. No.: WO2020/220625

PCT Pub. Date: Nov. 5, 2020

(65) Prior Publication Data

US 2022/0215855 A1 Jul. 7, 2022

(30) Foreign Application Priority Data

Apr. 29, 2019 (CN) ......................... 201910358510.9

(51) Int. Cl.
*G10L 21/034* (2013.01)
*G10L 21/0208* (2013.01)
(Continued)

(52) U.S. Cl.
CPC ........ *G10L 21/034* (2013.01); *G10L 21/0224* (2013.01); *G10L 25/21* (2013.01);
(Continued)

(58) Field of Classification Search
CPC ... G10L 21/034; G10L 21/0224; G10L 25/21; G10L 25/78; G10L 2021/02082;
(Continued)

(56) References Cited

U.S. PATENT DOCUMENTS 7,885,818 B2 2/2011 Vignoli
8,271,051 B2 9/2012 Wang
(Continued)

FOREIGN PATENT DOCUMENTS

CN 101106405 A * 1/2008
CN 101719969 A 6/2010
(Continued)

OTHER PUBLICATIONS

Notice of Reasons for Refusal dated Dec. 19, 2022 received in Japanese Patent Application No. JP 2021-564552.
(Continued)

*Primary Examiner* — Daniel C Washburn
*Assistant Examiner* — Paul J. Mueller
(74) *Attorney, Agent, or Firm* — Scully, Scott, Murphy & Presser, P.C.

(57) ABSTRACT

An automatic gain control method and apparatus, and a readable storage medium. The automatic gain control method includes: for a far-field speech signal of a current frame, distinguishing between a target signal and a non-target signal; according to a result of the distinguishing between the target signal and the non-target signal, determining a gain table calculation parameter of the far-field speech signal, and obtaining a gain variation of the far-field speech signal of the current frame relative to a previous frame; determining a gain value for the far-field speech signal of the current frame according to the gain variation; and processing the far-field speech signal of the current frame according to the gain value determined, to obtain a
(Continued)

processed speech signal. The automatic gain control method can effectively increase the gain of the target signal and reduce the gain of the non-target signal when gaining the far-field speech signal.

17 Claims, 4 Drawing Sheets

(51) Int. Cl.
*G10L 21/0216* (2013.01)
*G10L 21/0224* (2013.01)
*G10L 25/21* (2013.01)
*G10L 25/78* (2013.01)

(52) U.S. Cl.
CPC .... *G10L 25/78* (2013.01); *G10L 2021/02082* (2013.01); *G10L 2021/02166* (2013.01); *G10L 2025/783* (2013.01)

(58) Field of Classification Search
CPC ..... G10L 2021/02166; G10L 2025/783; G10L 21/0208; G10L 25/03; G10L 25/60
See application file for complete search history.

(56) References Cited

U.S. PATENT DOCUMENTS

| | | | | |
|---|---|---|---|---|
| 9,799,344 | B2 | 10/2017 | Tsutsumi et al. | |
| 10,152,982 | B2 | 12/2018 | Tsutsumi et al. | |
| 2011/0124380 | A1* | 5/2011 | Wang | H04M 9/082 455/570 |
| 2014/0307886 | A1* | 10/2014 | Olsson | G10L 21/0232 381/71.7 |
| 2015/0222988 | A1* | 8/2015 | Sorensen | G10L 21/0208 381/94.1 |
| 2016/0196818 | A1* | 7/2016 | Christoph | H04S 7/301 381/71.6 |
| 2016/0240202 | A1* | 8/2016 | Tsutsumi | G10L 19/135 |

FOREIGN PATENT DOCUMENTS

| | | | | | |
|---|---|---|---|---|---|
| CN | 105393303 | A | | 3/2016 | |
| CN | 105895084 | A | | 8/2016 | |
| CN | 106448722 | A | | 2/2017 | |
| CN | 106483502 | A | * | 3/2017 | G01S 5/18 |
| CN | 106571148 | A | * | 4/2017 | G10L 21/0208 |
| CN | 106653047 | A | * | 5/2017 | G10L 21/0272 |
| CN | 107360496 | A | | 11/2017 | |
| CN | 109068012 | A | | 12/2018 | |
| CN | 110111805 | A | | 8/2019 | |
| JP | 2006504130 | A | | 2/2006 | |
| JP | 2010054733 | A | | 3/2010 | |
| JP | 2014052553 | A | | 3/2014 | |
| JP | 2015087456 | A | | 5/2015 | |
| JP | 2016122111 | A | | 7/2016 | |
| WO | 2006106466 | A1 | | 10/2006 | |
| WO | 2014181330 | A1 | | 11/2014 | |

OTHER PUBLICATIONS

Office Action dated Nov. 23, 2020 received in Chinese Patent Application No. CN 201910358510.9 together with an English language translation.

* cited by examiner

AUTOMATIC GAIN CONTROL METHOD AND DEVICE, AND READABLE STORAGE MEDIUM

CROSS-REFERENCE TO RELATED APPLICATIONS

The present application is a national stage of PCT International Application No. PCT/CN2019/114764, filed on Oct. 31, 2019, which claims priority of Chinese Patent Application No. 201910358510.9, filed on Apr. 29, 2019. The entire contents of the above-listed applications are incorporated herein by reference as part of the present application.

CROSS-REFERENCE TO RELATED APPLICATION

The present application claims priority of Chinese Patent Application No. 201910358510.9, filed on Apr. 29, 2019, and the entire content disclosed by the Chinese patent application is incorporated herein by reference as part of the present application.

TECHNICAL FIELD

The embodiments of the present disclosure relate to an automatic gain control method, an automatic gain control apparatus, and a readable storage medium.

BACKGROUND

With the development of artificial intelligence technology, speech recognition technology has also been continuously improved. The speech recognition technology has been applied in many fields, such as voice assistant, smart TV, smart speaker, and so on. However, the basis of the speech recognition technology is how to obtain a high-quality target signal, that is, a speech signal of the instruction sender. High-quality target signals are beneficial to improve the accuracy of semantic recognition of speech signals. According to a distance between a sound source and a microphone array, the speech signal may be divided into a near-field audio signal and a far-field audio signal. However, there are many difficulties in the recognition of the far-field audio signal, such as how to perform gain after obtaining the far-field audio signal.

SUMMARY

At least one embodiment of the present disclosure provides an automatic gain control method, comprising: for a far-field speech signal of a current frame, distinguishing between a target signal and a non-target signal; according to a result of the distinguishing between the target signal and the non-target signal, determining a gain table calculation parameter of the far-field speech signal of the current frame, and obtaining a gain variation of the far-field speech signal of the current frame relative to a previous frame; determining a gain value for the far-field speech signal of the current frame according to the gain variation; and processing the far-field speech signal of the current frame according to the gain value determined, to obtain a processed speech signal.

For example, for the far-field speech signal of the current frame, distinguishing between the target signal and the non-target signal, comprises at least one of following operations: determining a probability that the far-field speech signal of the current frame is a voice signal, and judging whether the far-field speech signal of the current frame is the target signal or the non-target signal according to the probability, the target signal being the voice signal and the non-target signal being an environmental noise signal; according to a ratio of an energy of a signal collected by each microphone in the far-field speech signal of the current frame to a whole signal energy, judging whether the signal collected by each microphone in the current frame is the target signal or the non-target signal, the target signal being a target speech signal, and the non-target signal comprising at least one of following signals: an interference speech signal or an interference non-speech signal; or according to a double-talk judgment result in an acoustic echo cancellation calculation process of the far-field speech signal of the current frame, judging whether the far-field speech signal of the current frame is the target signal or the non-target signal, the target signal being a near-end speech signal and the non-target signal being a far-end speech signal.

For example, determining the probability that the far-field speech signal of the current frame is the voice signal, and judging whether the far-field speech signal of the current frame is the target signal or the non-target signal according to the probability, comprises: calculating to obtain the probability that the far-field speech signal of the current frame is the voice signal, and comparing the probability with a voice threshold that is predetermined; in a case where the probability is greater than the voice threshold, determining that the far-field speech signal of the current frame is the voice signal, otherwise determining that the far-field speech signal of the current frame is the environmental noise signal.

For example, according to the ratio of the energy of the signal collected by each microphone in the far-field speech signal of the current frame to the whole signal energy, judging whether the signal collected by each microphone in the current frame is the target signal or the non-target signal, comprises: in a case where a ratio of an energy of a signal collected by one microphone to the whole signal energy is maximum or greater than a predetermined threshold, determining that the signal collected by the one microphone is the target signal, otherwise determining that the signal collected by the one microphone is the non-target signal.

For example, according to the ratio of the energy of the signal collected by each microphone in the far-field speech signal of the current frame to the whole signal energy, judging whether the signal collected by each microphone in the current frame is the target signal or the non-target signal, comprises: acquiring a state value active_on of the signal collected by the one microphone in a microphone signal processing generalized sidelobe cancellation. In a case where the state value active_on=1, it indicates that the ratio of the energy of the signal collected by the one microphone to the whole signal energy is maximum or greater than the predetermined threshold; in a case where the state value active_on=0, it indicates that the ratio of the energy of the signal collected by the one microphone to the whole signal energy is not maximum or not greater than the predetermined threshold.

For example, according to the double-talk judgment result in the acoustic echo cancellation calculation process, judging the target signal and the non-target signal, comprises: acquiring the double-talk judgment result of the far-field speech signal of the current frame in the acoustic echo cancellation calculation process of the far-field speech signal collected by a microphone; in a case where the double-talk judgment result indicates that the far-field speech signal of the current frame comprises a near-end speech, determining that the far-field speech signal of the current frame is the near-end speech signal; and in a case where the double-talk judgment result indicates that the far-field speech signal of the current frame does not comprise the near-end speech, determining that the far-field speech signal of the current frame is the far-end speech signal.

For example, according to the result of the distinguishing between the target signal and the non-target signal, determining the gain table calculation parameter of the far-field speech signal of the current frame, and obtaining the gain variation of the far-field speech signal of the current frame relative to the previous frame, comprises: in a case where the far-field speech signal of the current frame is judged as the target signal, determining that the gain table calculation parameter of the far-field speech signal of the current frame takes a maximum gain value; and in a case where the far-field speech signal of the current frame is judged as the non-target signal, determining that the gain table calculation parameter of the far-field speech signal of the current frame takes a minimum gain value.

For example, according to the result of the distinguishing between the target signal and the non-target signal, determining the gain table calculation parameter of the far-field speech signal of the current frame, and obtaining the gain variation of the far-field speech signal of the current frame relative to the previous frame, further comprises: according to an equation: $gain\_cur(t)=\alpha*gain\_cur(t-1)+(1-\alpha)*gain$, obtaining a gain of the far-field speech signal of the current frame; and according to an equation: $\Delta gain=gain\_cur(t)-gain\_cur(t-1)$, obtaining the gain variation, where t is a count of frames, a is a smoothing coefficient, gain_cur(t−1) is a gain of a (t−1)-th frame, Again is the gain variation, and gain is the gain table calculation parameter of the far-field speech signal of a t-th frame.

For example, according to the result of the distinguishing between the target signal and the non-target signal, determining the gain table calculation parameter of the far-field speech signal of the current frame, and obtaining the gain variation of the far-field speech signal of the current frame relative to the previous frame, comprises: in a case where the signal collected by the one microphone of the far-field speech signal of the current frame is judged as the target signal, determining that the gain table calculation parameter of the signal collected by the one microphone of the far-field speech signal of the current frame takes a maximum gain value; and in a case where the signal collected by the one microphone of the far-field speech signal of the current frame is judged as the non-target signal, determining that the gain table calculation parameter of the signal collected by the one microphone of the far-field speech signal of the current frame takes a minimum gain value.

For example, according to the result of the distinguishing between the target signal and the non-target signal, determining the gain table calculation parameter of the far-field speech signal of the current frame, and obtaining the gain variation of the far-field speech signal of the current frame relative to the previous frame, further comprises: according to an equation: $gain\_cur(t)=\alpha*gain\_cur(t-1)+(1-\alpha)*gain$, obtaining a gain of the signal collected by the one microphone of the far-field speech signal of the current frame; and according to an equation: $\Delta gain=gain\_cur(t)-gain\_cur(t-1)$, obtaining the gain variation of the signal collected by the one microphone of the far-field speech signal of the current frame relative to the previous frame, where t is a count of frames, a is a smoothing coefficient, gain_cur(t−1) is a gain of the signal collected by the one microphone in a (t−1)-th frame, Δgain is the gain variation, and gain is the gain table calculation parameter of the signal collected by the one microphone of the far-field speech signal of a t-th frame.

For example, the maximum gain value is greater than 1, and the minimum gain value is 1 or less than 1.

For example, determining the gain value for the far-field speech signal of the current frame according to the gain variation, comprises: in a case where the gain variation is greater than a predetermined threshold, determining the gain value for the far-field speech signal of the current frame according to a gain table; otherwise, using a gain value of the previous frame as the gain value for the far-field speech signal of the current frame.

At least one embodiment of the present disclosure also provides an automatic gain control apparatus, comprising: a judging unit, configured to distinguish between a target signal and a non-target signal for a far-field speech signal of a current frame; a gain calculation unit, configured to according to a result of the distinguishing between the target signal and the non-target signal, determine a gain table calculation parameter of the far-field speech signal of the current frame, and obtain a gain variation of the far-field speech signal of the current frame relative to a previous frame; a gain table updating unit, configured to determine a gain value for the far-field speech signal of the current frame according to the gain variation; and an amplification processing unit, configured to process the far-field speech signal of the current frame according to the gain value determined to obtain a processed speech signal.

For example, the judging unit comprises: a first judging sub-unit, configured to determine a probability that the far-field speech signal of the current frame is a voice signal, and judge whether the far-field speech signal of the current frame is the target signal or the non-target signal according to the probability, where the target signal is the voice signal and the non-target signal is an environmental noise signal; a second judging sub-unit, configured to judge whether a signal collected by each microphone in the current frame is the target signal or the non-target signal, according to a ratio of an energy of the signal collected by each microphone in the far-field speech signal of the current frame to a whole signal energy, where the target signal is a target speech signal and the non-target signal comprises at least one of following signals: an interference speech signal or an interference non-speech signal; or a third judging sub-unit, configured to judge whether the far-field speech signal of the current frame is the target signal or the non-target signal, according to a double-talk judgment result in an acoustic echo cancellation calculation process of the far-field speech signal of the current frame, where the target signal is a near-end speech signal and the non-target signal is a far-end speech signal.

For example, the first judging sub-unit is further configured to: calculate to obtain the probability that the far-field speech signal of the current frame is the voice signal, and compare the probability with a voice threshold that is predetermined; in a case where the probability is greater than the voice threshold, determine that the far-field speech signal of the current frame is the voice signal, otherwise determine that the far-field speech signal of the current frame is the environmental noise signal.

For example, the second judging sub-unit is further configured to: in a case where a ratio of an energy of a signal collected by one microphone to the whole signal energy is maximum or greater than a predetermined threshold, determine that the signal collected by the one microphone is the target signal, otherwise determine that the signal collected by the one microphone is the non-target signal.

For example, the second judging sub-unit is further configured to: acquire a state value active_on of the signal collected by the one microphone in a microphone signal processing generalized sidelobe cancellation, where in a case where the state value active_on=1, it indicates that the ratio of the energy of the signal collected by the one microphone to the whole signal energy is maximum or greater than the predetermined threshold; in a case where the state value active_on=0, it indicates that the ratio of the energy of the signal collected by the one microphone to the whole signal energy is not maximum or not greater than the predetermined threshold.

For example, the third judging sub-unit is further configured to: acquire the double-talk judgment result of the far-field speech signal of the current frame in the acoustic echo cancellation calculation process of the far-field speech signal collected by a microphone; in a case where the double-talk judgment result indicates that the far-field speech signal of the current frame comprises a near-end speech, determine that the far-field speech signal of the current frame is the near-end speech signal; and in a case where the double-talk judgment result indicates that the far-field speech signal of the current frame does not comprise the near-end speech, determine that the far-field speech signal of the current frame is the far-end speech signal.

For example, the gain calculation unit is further configured to: in a case where the far-field speech signal of the current frame is judged as the target signal, determine that the gain table calculation parameter of the far-field speech signal of the current frame takes a maximum gain value; and in a case where the far-field speech signal of the current frame is judged as the non-target signal, determine that the gain table calculation parameter of the far-field speech signal of the current frame takes a minimum gain value.

For example, the gain calculation unit is further configured to: in a case where the signal collected by the one microphone of the far-field speech signal of the current frame is judged as the target signal, determine that the gain table calculation parameter of the signal collected by the one microphone of the far-field speech signal of the current frame takes a maximum gain value; and in a case where the signal collected by the one microphone of the far-field speech signal of the current frame is judged as the non-target signal, determine that the gain table calculation parameter of the signal collected by the one microphone of the far-field speech signal of the current frame takes a minimum gain value.

For example, the gain table updating unit is further configured to: in a case where the gain variation is greater than a predetermined threshold, determine the gain value for the far-field speech signal of the current frame according to a gain table; otherwise, using a gain value of the previous frame as the gain value for the far-field speech signal of the current frame.

For example, the automatic gain control apparatus further comprises an acquisition unit, the acquisition unit is configured to acquire the far-field speech signal.

For example, the acquisition unit comprises: a microphone, configured to acquire a speech signal; and a determination sub-unit, configured to determine the far-field speech signal from the speech signal.

At least one embodiment of the present disclosure also provides an automatic gain control apparatus, comprising: a processor; a memory, configured to store instructions. When the instructions are executed by the processor, the processor is caused to perform the automatic gain control method according to any one of embodiments of the present disclosure.

For example, the automatic gain control apparatus further comprises a microphone, the microphone is configured to acquire the far-field speech signal.

At least one embodiment of the present disclosure also provides a readable storage medium, on which executable instructions are stored, when the executable instructions are executed by one or more processors, the one or more processors are caused to perform the automatic gain control method as described above.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
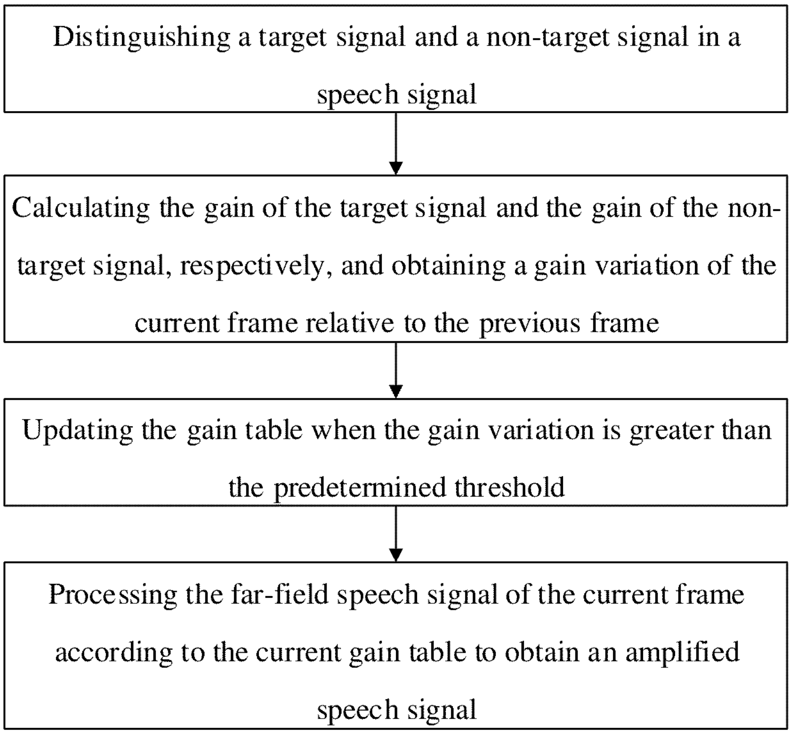
FIG. 1 is a flowchart of an automatic gain control method in far-field speech interaction according to at least one embodiment of the present disclosure.

In order to make objects, technical details, and advantages of the embodiments of the present disclosure apparent, the technical solutions of the embodiments of the present disclosure will be described in a clearly and fully understandable way in connection with the drawings. Apparently, the described embodiments are just a part but not all of the embodiments of the present disclosure. Based on the described embodiments of the present disclosure herein, those skilled in the art can obtain all other embodiment(s), without any inventive work, which should be within the protection scope of the present disclosure.

AGC (Automatic Gain Control) is used to gain different parts of a speech signal according to the difference of the speech signal. However, most of the existing AGC methods aim at the gain of the near-field speech signal, and the gain is achieved by using a fixed gain factor. Therefore, a new AGC method is needed to gain the far-field speech signal, which can effectively gain a target signal and reduce the gain to a non-target signal.

In view of the problem that the above-mentioned gain control method can only gain the overall gain of the speech signal, but cannot gain the target signal and the non-target signal in the far-field speech signal, respectively, the present disclosure provides an automatic gain control method in far-field speech interaction, the automatic gain control method can effectively increase the gain of the target signal and reduce the gain of the non-target signal when gaining the far-field speech signal. Here, the target signal is a speech signal of an instruction sender, and the non-target signal includes but is not limited to an audio signal played by a loudspeaker, a speech signal existing in the environment, and a non-speech signal existing in the environment.

In the embodiment of the present disclosure, the above-mentioned near-field and far-field are defined as follows: when the distance between the sound source and the central reference point of the microphone array is far greater than the signal wavelength, the speech signal is the far-field speech signal, otherwise, the speech signal is the near-field speech signal. For example, supposing that the distance (also called an array aperture) between adjacent microphones of a uniform linear microphone array may be d; the wavelength of the speech having the highest frequency of the sound source (that is, the minimum wavelength of the sound source) is $\lambda$min. When the distance from the sound source to the center of the microphone array is greater than $2D^2/\lambda$min, where $D=d*(m-1)$ and m is the number of microphones in the uniform linear microphone array, the speech signal is the far-field speech signal, otherwise the speech signal is the near-field speech signal.

In order to make the objects, technical solutions, and advantages of the present disclosure clearer, the present disclosure will be further described in detail with reference to specific embodiments and drawings.

Some embodiments of the present disclosure will be described more fully hereinafter with reference to the accompany drawings, some but not all of the embodiments will be shown. Actually, the various embodiments of the present disclosure may be implemented in many different forms, and should not be interpreted as being limited to the embodiments set forth herein. In contrast, these embodiments are provided so that the disclosure meets the applicable legal requirements.

At least one embodiment of that present disclosure provides an automatic gain control method. The automatic gain control method includes: for a far-field speech signal of a current frame, distinguishing between a target signal and a non-target signal; according to a result of the distinguishing between the target signal and the non-target signal, determining a gain table calculation parameter of the far-field speech signal of the current frame, and obtaining a gain variation of the far-field speech signal of the current frame relative to a previous frame; determining a gain value for the far-field speech signal of the current frame according to the gain variation; and processing the far-field speech signal of the current frame according to the gain value determined, to obtain a processed speech signal.

In at least one exemplary embodiment of the present disclosure, an automatic gain control method in the far-field speech interaction is provided. FIG. 1 is a flowchart of an automatic gain control method in the far-field speech interaction according to at least one embodiment of the present disclosure. As shown in FIG. 1, the automatic gain control method in the far-field speech interaction of the present disclosure includes:

distinguishing a target signal and a non-target signal in a far-field speech signal; the target signal is a speech signal sent by the instruction sender, and the non-target signal includes, but is not limited to, the audio signal played by a loudspeaker, the speech signal existing in the environment, and the non-speech signal existing in the environment.

After obtaining the judgement result of the target signal and the non-target signal, it is necessary to calculate the gain of the target signal and the gain of the non-target signal, respectively. When it is judged that the current signal is the target signal, the gain table calculation parameter of the calculation gain table takes the maximum gain value, the maximum gain value is greater than 1; when it is judged that the current signal is the non-target signal, the gain table calculation parameter of the calculation gain table takes the minimum gain value, the minimum gain value is 1 or less than 1.

After calculating the gain of the current frame, calculating the gain variation of the far-field speech signal of the current frame relative to the previous frame. In order to prevent the fluctuation of the collected signal from frequently updating the gain table, a predetermined threshold is set and compared with the gain variation. Only when the gain variation is greater than the predetermined threshold, the gain table is updated; otherwise, the old gain table is used.

The far-field speech signal of the current frame is processed according to the current gain table to obtain an amplified speech signal. Therefore, when gaining the far-field speech signal, it can effectively amplify the target signal and reduce the gain of the non-target signal. The gain method that distinguishes the target signal and the non-target signal can improve the quality of the speech signal.

In at least one exemplary embodiment of the present disclosure, an automatic gain control method in the far-field speech interaction is provided, the gain is updated according to the speech probability. Far-field speech signals in different time ranges may be divided into a voice signal and an environmental noise signal. In this scenario, the target signal and the non-target signal are simplified. It is assumed that the collected signal only contains the speaking speech of the commander and the environmental noise, that is, the voice signal is used as the target signal, and the environmental noise signal is the non-target signal. For this kind of far-field speech signal, judging the probabilities of the speech signals in different time periods, and updating the gain table with different energies by using the probability of speech existence.

Specifically, the judging method comprises the following steps: judging whether the probability that the far-field speech signal in a certain period of time is a voice signal is greater than a voice threshold, the voice threshold is a predetermined value, when the collected signal is a voice signal, the probability is relatively large, otherwise, the probability is relatively small Therefore, a critical value is set as the voice threshold according to experience. If the probability is greater than the voice threshold, the maximum gain is performed on the speech signal in the period of time. If the probability is less than or equal to the voice threshold, the maximum gain is reduced for the speech signal in the period of time.

Figure 2:
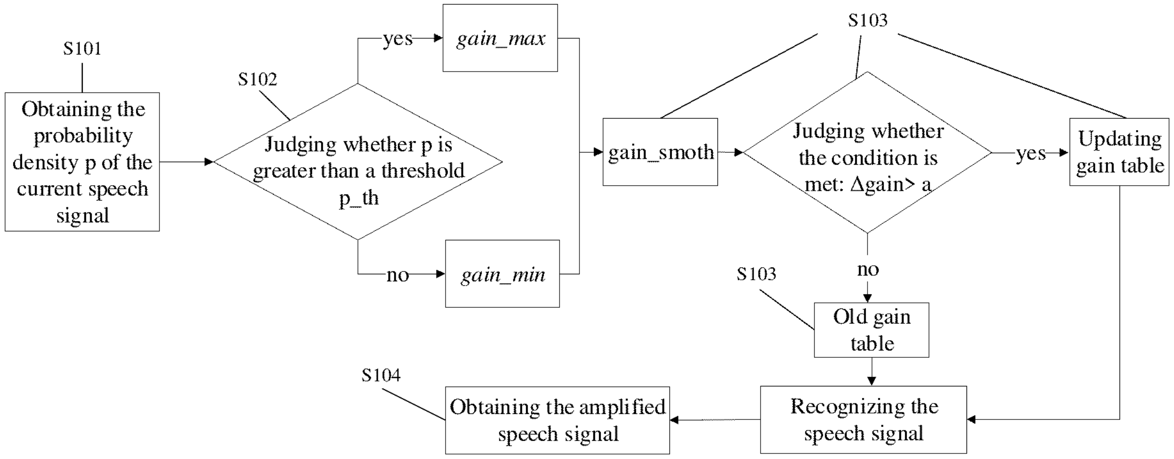
FIG. 2 is an algorithm flowchart of an automatic gain control method in far-field speech interaction according to at least one embodiment of the present disclosure.

FIG. 2 is an algorithm flowchart of the automatic gain control method in the far-field speech interaction according to at least one embodiment of the present disclosure. As shown in FIG. 2, the automatic gain control method in the far-field speech interaction according to at least one embodiment of the present disclosure includes:

S101, calculating the probabilities of the far-field speech signal in different periods of time, and the probability density including the probability that the far-field speech signal is the voice signal and/or the probability that the far-field speech signal is the non-voice signal;

S102, judging whether the probability that the far-field speech signal in a certain period of time is a voice signal is greater than a predetermined voice threshold p_th, and if the probability is greater than the voice threshold, performing the maximum gain on the speech signal in the certain period of time; if the probability is less than or equal to the voice threshold p_th, performing the minimum gain on the voice signal in the certain period of time;

S103, performing the gain smoothing, and judging whether the gain variation is greater than a predetermined threshold; updating the gain table if the gain variation is greater than the predetermined threshold, otherwise using the old gain table;

S104, processing the far-field speech signal of the current frame according to the current gain table to obtain an amplified speech signal.

Specifically, the step S101 includes: calculating to obtain the probability density p of the current signal.

The step S102 includes:

when the probability density p>p_th, gain=gain_max; when p<p_th, gain=gain_min, and in this case the current gain gain_cur(t)=α*gain_cur(t−1)+(1−α)*gain;

where t is the number of frames, p_th is the voice threshold, gain is the gain table calculation parameter of the calculation gain table, gain_max is the maximum gain value, gain_min is the minimum gain value, a is the smoothing coefficient, and the value of α is an empirical value, and gain_cur(t−1) is the gain of the previous frame.

The step S103 includes:

gain variation Δgain=gain_cur(t)−gain_cur(t−1), when Δgain>a, updating the gain table, and after updating the gain table, making gain_cur(t−1)=gain_cur(t), where Δgain is the gain variation and a is the predetermined variation threshold. The gain table calculates according to the energy to obtain the gains corresponding to different energies.

For example, in at least one embodiment in the present disclosure, for the far-field speech signal of the current frame, distinguishing between the target signal and the non-target signal, may include:

determining a probability that the far-field speech signal of the current frame is a voice signal, and judging whether the far-field speech signal of the current frame is the target signal or the non-target signal according to the probability, and the target signal being the voice signal and the non-target signal being the environmental noise signal.

For example, if the probability that the far-field speech signal of a frame is a voice signal is greater than a predetermined voice threshold, it is judged that the far-field speech signal of the frame is the voice signal, otherwise it is judged that the far-field speech signal of the frame is an environmental noise signal.

For example, the probability that the far-field speech signal of the frame is the voice signal may be calculated by the following steps:

for an audio signal x collected by a microphone, calculating an energy E of the whole signal;

calculating the signal energy $E_n$ of the frame; and calculating the ratio $P_n=E_n/E$ of the signal energy $E_n$ of the frame to the signal energy E of the whole signal, and using the ratio as the probability that the far-field speech signal of the frame is a voice signal.

For example, in at least one embodiment of the present disclosure, according to a result of the distinguishing between the target signal and the non-target signal, determining a gain table calculation parameter of the far-field speech signal of the current frame, and obtaining a gain variation of the far-field speech signal of the current frame relative to a previous frame, comprises:

in a case where the far-field speech signal of the current frame is judged as the target signal, determining that the gain table calculation parameter of the far-field speech signal of the current frame takes a maximum gain value; and in a case where the far-field speech signal of the current frame is judged as the non-target signal, determining that the gain table calculation parameter of the far-field speech signal of the current frame takes a minimum gain value.

For example, when the probability p that the far-field speech signal of the current frame is a voice signal is greater than the predetermined voice threshold p_th, the gain table calculation parameter gain of the far-field speech signal of the current frame takes the maximum gain value gain_max, that is, gain=gain_max; when the probability p that the far-field speech signal of the current frame is a voice signal is less than the predetermined voice threshold p_th, the gain table calculation parameter gain of the far-field speech signal of the current frame takes the minimum gain value gain_min, that is, gain=gain_min.

For example, according to the equation gain_cur(t)=α*gain_cur(t−1)+(1−α)*gain, obtaining the gain of the far-field speech signal of the current frame; and according to the equation Δgain=gain_cur(t)−gain_cur(t−1), obtaining the gain variation, where t is the count of frames, gain is the gain table calculation parameter of the far-field speech signal of the t-th frame, gain_max is the maximum gain value, gain_min is the minimum gain value, a is the smoothing coefficient, and the value of α is an empirical value, and gain_cur(t−1) is the gain of the (t−1)-th frame. For example, the maximum gain value gain_max is greater than 1, and the minimum gain value gain_min is 1 or less than 1.

For example, if the gain variation Δgain is greater than a predetermined threshold, the gain value for the far-field speech signal of the current frame is determined according to a predetermined gain table; otherwise, the gain value of the previous frame is used as the gain value of the far-field speech signal of the current frame.

For example, the gain table is predetermined and includes the relationship between the energy level of the audio signal and the gain value. For an energy level of the audio signal, the corresponding gain value may be determined by the gain table.

For example, each frame of the far-field speech signal has the same time length.

In this embodiment, by judging the probability of whether the far-field speech signal is a voice signal in a period of time, the voice signal and the non-voice signal are distinguished, so that the voice signal is greatly increased, and the non-voice signal is not increased, which improves the accuracy of speech recognition in the later stage, especially avoids the phenomenon of multi-word speech recognition caused by the mixing of the interference signal and the like.

In at least one exemplary embodiment of the present disclosure, an automatic gain control method in the far-field speech interaction is provided. In the method, the gain is updated according to the result of judging the target signal and the interference signal. The far-field speech signal is collected by a microphone array. In the signal processing of the microphone array, it is necessary to distinguish between the target speech signal close to the instruction sender and the interference signal away from the instruction sender. At this time, the target signal is the target speech signal close to the instruction sender, and the non-target instruction is the interference voice away from the instruction sender. Distinguishing whether the signals in different periods of time are an interference signal or a target signal and using the judgment result of the distinguishing operation, which can improve the gain of the target signal, and decrease the gain of the interference signal (including the speech signal or the non-speech signal).

Specifically, according to the ratio of a microphone signal energy to the whole signal energy, judging whether to gain the signal of the microphone or not. For the far-field signal, the energy of the signal is directional. The closer the signal is to the propagation direction, the larger the energy ratio occupied by the signal collected by the microphone. At this time, the collected signal is closer to the user's speech instruction, and gaining this signal is helpful for the later semantic recognition. The signal is away from the propagation direction, the energy ratio occupied by the signal collected by the microphone is small, and in this case, there is a lot of noise in the signal, so the signal may not be gained.

Figure 3:
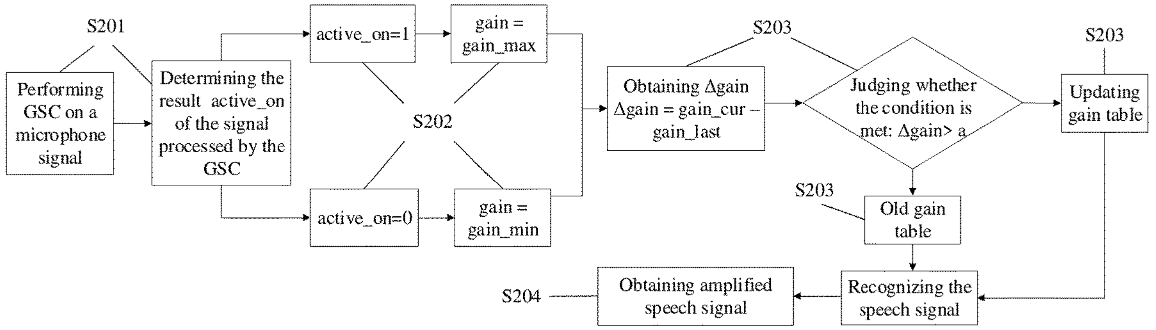
FIG. 3 is an algorithm flowchart of an automatic gain control method in far-field speech interaction according to at least one embodiment of the present disclosure.

FIG. 3 is an algorithm flowchart of an automatic gain control method in the far-field speech interaction according to at least one embodiment of the present disclosure. As shown in FIG. 3, the automatic gain control method in the far-field speech interaction in this embodiment includes:

- S201, obtaining the judgment result of a target speech and a non-target speech in each frame in a microphone signal processing generalized sidelobe cancellation (GSC);
- S202, according to the judgment result, if the target speech signal is currently dominant, performing maximum gain on the microphone signal; if the non-target speech signal is currently dominant, performing minimum gain on the microphone signal;
- S203, performing gain smoothing, and judging whether the gain variation is greater than a predetermined threshold, if the gain variation is greater than the predetermined threshold, updating the gain table, otherwise using the old gain table;
- S204, processing the far-field speech signal of the current frame according to the current gain table to obtain an amplified speech signal.

Specifically, the step S201 includes: in the microphone signal processing GSC, the state value active_on of each frame signal being the target speech and the non-target speech is obtained, and the state value active_on represents the importance of the energy of one microphone signal relative to the whole signal energy, and the value of the state value may be 1 or 0. When active_on=1, it means that the target speech is currently dominant; when active_on=0, it means that the non-target speech is currently dominant, that is, the interference signal is dominant, and the interference signal includes the interference speech signal and the interference non-speech signal.

The step S202 includes: when active_on=1, gain=gain_max; when active_on=0, gain=gain_min, at this time, the current gain $gain\_cur(t)=\alpha*gain\_cur(t-1)+(1-\alpha)*gain$. Where t is the number of frames, gain is the gain table calculation parameter of the calculation gain table, gain_max is the maximum gain value, gain_min is the minimum gain value, $\alpha$ is the smoothing coefficient, and the value of $\alpha$ is an empirical value, and gain_cur(t−1) is the gain of the (t−1)-th frame.

The step S203 includes: letting $\Delta gain=gain\_cur(t)-gain\_cur(t-1)$; when $\Delta gain>a$, updating the gain table, and after updating the gain table, gain_cur(t−1)=gain_cur(t), where $\Delta gain$ is the gain variation, a is a predetermined variation threshold. The gain table calculates according to the energy to obtains the gains corresponding to different energies.

For example, in at least one embodiment of the present disclosure, the far-field speech signal of each frame includes signals collected by a plurality of microphones, and for the far-field speech signal of the current frame, distinguishing between the target signal and the non-target signal, includes:

according to a ratio of an energy of a signal collected by each microphone in the far-field speech signal of the current frame to a whole signal energy, judging whether the signal collected by each microphone in the current frame is the target signal or the non-target signal. The target signal is a target speech signal, and the non-target signal comprises at least one of the following signals: an interference speech signal or an interference non-speech signal.

For example, if a ratio of an energy of a signal collected by one microphone to the energy of the far-field speech signal of the frame is greater than a predetermined threshold, it is judged that the signal collected by the one microphone is a voice signal, and otherwise, it is judged that the signal collected by the one microphone is an interference signal.

For another example, in a far-field speech signal of a frame, the signal, of which the energy ratio is the largest, collected by one microphone is judged as a voice signal, here, the energy ratio is a ratio of the energy of the signal collected by the one microphone to the energy of the far-field speech signal of the frame. The signals collected by other microphones in the far-field speech signal of the frame are judged as interference signals.

For example, the ratio of the energy of the signal collected by each microphone to the energy of the far-field speech signal of the frame may be calculated by the following steps:

it is assumed that the far-field speech signal of the frame includes signals $X_m$ collected by M microphones, the total energy of the signals collected by the M microphones is $E_\Sigma$.

In this way, the ratio of the signal collected by each microphone to the energy of the far-field speech signal of the frame is calculated as $P_m=E_m/E_\Sigma$.

For example, according to the ratio of the energy of the signal collected by each microphone in the far-field speech signal of the current frame to the whole signal energy, judging whether the signal collected by each microphone in the current frame is the target signal or the non-target signal, includes: acquiring a state value active_on of the signal collected by the one microphone in a microphone signal processing generalized sidelobe cancellation. When the state value active_on=1, it indicates that the ratio of the energy of the signal collected by the one microphone to the whole signal energy is maximum or greater than the predetermined threshold; when the state value active_on=0, it indicates that the ratio of the energy of the signal collected by the one microphone to the whole signal energy is not maximum or not greater than the predetermined threshold.

For example, if the state value active_on of the signal collected by the one microphone of the far-field speech signal of the current frame is 1, the gain table calculation parameter gain of the signal collected by the one microphone of the far-field speech signal of the current frame takes the maximum gain value gain_max, that is, gain=gain_max; when the state value active_on of the signal collected by the one microphone of the far-field speech signal of the current frame is 0, the gain table calculation parameter gain of the signal collected by the one microphone of the far-field speech signal of the current frame takes the minimum gain value gain_min, that is, gain=gain_min.

For example, according to the equation gain_cur(t)=α*gain_cur(t−1)+(1−α)*gain, the gain of the signal collected by the one microphone of the far-field speech signal of the current frame is obtained; according to the equation Δgain=gain_cur(t)−gain_cur(t−1), the gain variation of the signal collected by the one microphone of the far-field speech signal of the current frame relative to the previous frame, where t is the number of frames, gain is the gain table calculation parameter of the signal collected by the one microphone of the far-field speech signal of a t-th frame, gain_max is the maximum gain value, gain_min is the minimum gain value, α is the smoothing coefficient, and the value of α is an empirical value, and gain_cur(t−1) is the gain of the signal collected by the one microphone of the far-field speech signal of the (t−1)-th frame. For example, the maximum gain value gain_max is greater than 1, and the minimum gain value gain_min is 1 or less than 1.

For example, if the gain variation Δgain is greater than a predetermined threshold, the gain value of the far-field speech signal of the current frame is determined according to a predetermined gain table; otherwise, the gain value of the previous frame is used as the gain value of the far-field speech signal of the current frame.

For example, the gain table is predetermined and includes the relationship between the energy level of the audio signal and the gain value. For an energy level of the audio signal, the corresponding gain value may be determined by the gain table.

In this embodiment, it is judged whether a signal collected by the microphone is important or not by the ratio of the energy of the signal collected by the microphone to the whole signal energy. If the signal collected by the microphone is important, the gain is greater than 1; if the signal collected by the microphone is not important, the gain is 1 or less than 1. So that, in the collected far-field speech signal, the target signal is greatly increased, thereby improving the accuracy of the later semantic recognition.

In at least one exemplary embodiment of the present disclosure, an automatic gain control method in the far-field speech interaction is provided. In the method, the gain is updated according to a double-talk result. In this embodiment, while the speaker is playing music, the user issues an instruction, and AEC (Acoustic Echo Cancellation) is required to be performed on the far-field speech signal collected at this time. According to the double-talk judgment result in the AEC, the double-talk judgment result may be used to distinguish the near-end speech signal from the far-end speech signal, where the near-end speech signal refers to the speech signal closer to the instruction sender and the far-end speech signal refers to the signal away from the instruction sender. When the far-field speech signal is judged as double-talk, the current microphone signal contains the near-end speech, in this case, the gain is increased, while when the far-field speech signal is not double-talk, the current microphone signal does not contain the near-end speech, but comprises only the far-end speech played by the speaker, so the gain takes a smaller value.

Figure 4:
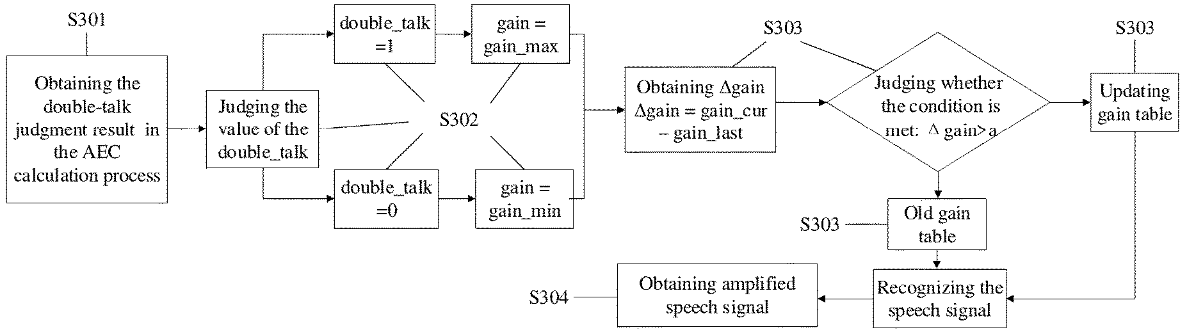
FIG. 4 is an algorithm flowchart of an automatic gain control method in far-field speech interaction according to at least one embodiment of the present disclosure.

FIG. 4 is an algorithm flowchart of an automatic gain control method in the far-field speech interaction according to at least one embodiment of the present disclosure. As shown in FIG. 4, the automatic gain control method in the far-field speech interaction in this embodiment includes:

S301, acquiring the double-talk judgment result in the AEC calculation process, determining the current signal is dominated by the near-end speech signal or the far-end speech signal according to the double-talk judgment result;

S302, if the current signal is dominated by the near-end speech signal, performing maximum gain on the microphone signal; if the current signal is dominated by the far-end speech signal, performing minimum gain on the microphone signal;

S303, performing gain smoothing, judging whether the gain variation is greater than a predetermined threshold, and if the gain variation is greater than the predetermined threshold, updating the gain table, otherwise using the old gain table;

S304, processing the far-field speech signal of the current frame according to the current gain table to obtain an amplified speech signal.

For example, the step S301 includes: acquiring the double-talk judgment result double_talk in the AEC calculation process, where double_talk=1 or 0. When double_talk=1, it means that the current microphone signal contains the near-end speech, and when double_talk=0, it means that the current microphone signal does not contain the near-end speech, but only contains the far-end speech played by the speaker.

The step S302 includes: when double_talk=1, it means that the near-end speech is dominant at present, and gain=gain_max; when double_talk=0, it means that the far-end speech is dominant at present, and gain=gain_min, at this time, the current gain gain_cur(t)=α*gain_cur(t−1)+(1−α)*gain. Where t is the number of frames, gain is the gain table calculation parameter of the calculation gain table, gain_max is the maximum gain value, gain_min is the minimum gain value, α is the smoothing coefficient, and the value of α is an empirical value, and gain_cur(t−1) is the gain of the previous frame.

The step S303 includes: letting Δgain=gain_cur(t)−gain_cur(t−1), when Δgain>a, updating the gain table at this time, and after updating the gain table, gain_cur(t−1)=gain_cur(t), where Δgain is the gain variation, a is a predetermined variation value. The gain table calculates according to the energy to obtain the gains corresponding to different energies.

For example, the above-mentioned double-talk judgment in the above-mentioned AEC calculation process may be implemented through the double-talk detection in the SPEEX algorithm.

For example, in at least one embodiment of the present disclosure, for the far-field speech signal of the current frame, distinguishing between the target signal and the non-target signal, includes:

according to a double-talk judgment result in an acoustic echo cancellation calculation process of the far-field speech signal of the current frame, judging whether the far-field speech signal of the current frame is the target signal or the non-target signal. The target signal is a near-end speech signal and the non-target signal is a far-end speech signal.

For example, if the double-talk judgment result indicates that double-talk exists, that is, in the case where the far-field speech signal of the current frame contains the near-end speech, it is determined that the far-field speech signal of the current frame is dominated by the near-end speech signal, thereby determining that the far-field speech signal of the current frame is a near-end speech signal. If the double-talk judgment result indicates that double-talk dose not exist, that is, in a case where the far-field speech signal of the current frame does not contain the near-end speech, but only contains the far-end speech played by the loudspeaker, it is determined that the far-field speech signal of the current frame is dominated by the far-end speech signal, thereby determining that the far-field speech signal of the current frame is a far-end speech signal.

For example, the double-talk judgment result of the double-talk detection is expressed by the above double_talk. When double_talk=1, it means that the current microphone signal contains the near-end speech, and when double_talk=0, it means that the current microphone signal does not contain the near-end speech, but only contains the far-end speech played by the speaker.

For example, if the double-talk judgment result double_talk of the far-field speech signal of the current frame is 1, the gain table calculation parameter gain of the far-field speech signal of the current frame takes the maximum gain value gain_max, that is, gain=gain_max; if the double-talk judgment result double_talk of the far-field speech signal of the current frame is 0, the gain table calculation parameter gain of the far-field speech signal of the current frame takes the minimum gain value gain_min, that is, gain=gain_min.

For example, according to the equation $gain\_cur(t)=\alpha*gain\_cur(t-1)+(1-\alpha)*gain$, the gain of the far-field speech signal of the current frame is obtained; according to the equation $\Delta gain=gain\_cur(t)-gain\_cur(t-1)$, the gain variation is obtained, where t is the number of frames, gain is the gain table calculation parameter of the far-field speech signal of the t-th frame, gain_max is the maximum gain value, gain_min is the minimum gain value, a is the smoothing coefficient, and the value of $\alpha$ is an empirical value, and gain_cur(t−1) is the gain of the previous frame. For example, the maximum gain value gain_max is greater than 1, and the minimum gain value gain_min is 1 or less than 1.

For example, if the gain variation Δgain is greater than a predetermined threshold, the gain value for the far-field speech signal of the current frame is determined according to a predetermined gain table; otherwise, the gain value of the previous frame is used as the gain value for the far-field speech signal of the current frame.

For example, the gain table is predetermined and includes the relationship between the energy level of the audio signal and the gain value. For an energy level of the audio signal, the corresponding gain value may be determined according to the gain table.

In this embodiment, by judging the far-field speech signal after being performed AEC, it is judged whether any residual voice still exists in the signal after AEC. AGC is performed after AEC, if no residual voice exists, the gain may not be performed. It can be determined that no voice command has issued in the later semantic recognition, which is helpful to improve the accuracy of semantic recognition. The method of this embodiment can distinguish the speech signal sent by the instruction sender from the speech signal in the environment background and distinguish the gain to improve the quality of the speech signal.

It should be noted that the different gain update methods of the above embodiments may be flexibly combined according to the needs, and one of them may be selected, and two or three of them may be combined to obtain different gain updates.

In at least one embodiment, before distinguishing between the target signal and the non-target signal, the automatic gain control method may further comprise: acquiring a far-field speech signal.

For example, the method for acquiring the far-field speech signal may further include: collecting an audio signal; and determining the far-field speech signal from the collected audio signal.

For example, the far-field speech signal may be determined according to the far-field definition provided above. Embodiments of the present disclosure are not limited to this.

Figure 5:
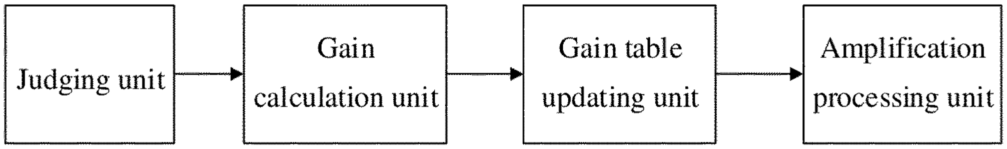
FIG. 5 is a block diagram of an automatic gain control apparatus in far-field speech interaction according to at least one embodiment of the present disclosure.

As shown in FIG. 5, at least one embodiment of the present disclosure also provides an automatic gain control apparatus in the far-field speech interaction. The automatic gain control apparatus comprises:

- a judging unit, configured to distinguish between a target signal and a non-target signal in a far-field speech signal;
- a gain calculation unit, configured to calculate gain of the target signal and gain of the non-target signal, respectively, and obtain a gain variation of the far-field speech signal of the current frame relative to a previous frame;
- a gain table updating unit, configured to update the gain table when the gain variation is greater than a predetermined threshold;
- an amplification processing unit, configured to process the far-field speech signal of the current frame according to the current gain table to obtain an amplified speech signal.

Figure 6:
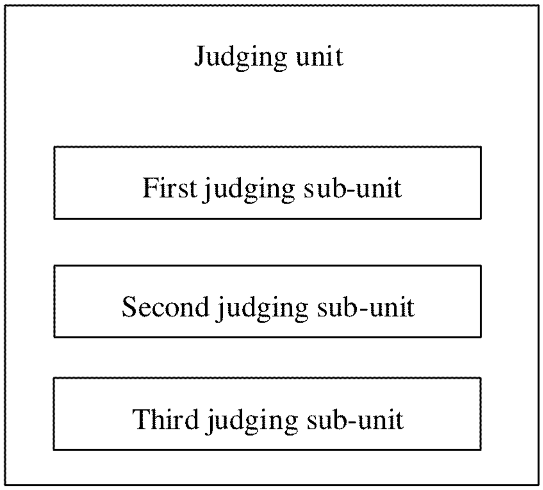
FIG. 6 is a schematic block diagram of a judging unit according to at least one embodiment of the present disclosure.

FIG. 6 is a schematic block diagram of a judging unit according to at least one embodiment of the present disclosure. As shown in FIG. 6, the judging unit includes:

- a first judging sub-unit, configured to judge probabilities that the far-field speech signals in different periods of time are a voice signal, and distinguish between the target signal or the non-target signal according to the probability judgement result, where the target signal is the voice signal and the non-target signal is an environmental noise signal; and/or
- a second judging sub-unit, configured to obtain the judgment result of the target signal and the non-target signal in the signal collected by the microphone in each frame by the ratio of the energy of the signal collected by each microphone to the whole signal energy, where the target signal is a target speech signal and the non-target signal is an interference speech signal and/or an interference non-speech signal; and/or
- a third judging sub-unit, configured to judge the target signal and the non-target signal, according to a double-talk judgment result obtained in an acoustic echo cancellation calculation process, where the target signal is a near-end speech signal and the non-target signal is a far-end speech signal.

The first judging sub-unit calculates to obtain the probability p of the far-field speech signal in the current period of time, and compare the probability p with a predetermined voice threshold. When the probability p is greater than the voice threshold, the far-field speech signal is judged as a voice signal, otherwise the far-field speech signal is judged as an environmental noise signal.

The second judging sub-unit is configured to obtain the state value active_on of the signal of each frame in a microphone signal processing generalized sidelobe cancellation, if the state value active_on=1, judge the signal as a target speech signal, if the state value active_on=0, judged the signal as an interference speech signal and/or an interference non-speech signal.

The third judging sub-unit is configured to obtain the double-talk judgment result double_talk of the signal of each frame in the acoustic echo cancellation calculation process of the far-field speech signal collected by a microphone, if the double_talk=1, judge the signal of the frame as a near-end speech signal; if the double_talk=0, judge the signal of the frame as a far-end speech signal.

It should be noted that the above-mentioned different judging sub-units may be flexibly combined as required.

The gain calculation unit is configured to calculate the gain of the current frame according to the judgment result of the target signal and the non-target signal. If the far-field speech signal of the current frame is a target signal, the gain table calculation parameter gain for the calculation gain table takes the maximum gain value; if the far-field speech signal of the current frame is a non-target signal, the gain table calculation parameter gain for the calculation gain table takes the minimum gain value. The gain calculation unit is also configured to obtain the difference between the gain value of the current frame and the gain value of the previous frame as the gain variation. The maximum gain value is greater than 1, and the minimum gain value is 1 or less than 1.

The gain table updating unit includes a predetermined threshold. If the difference between the gain value of the current frame and the gain value of the previous frame is greater than the predetermined threshold, the gain table is calculated and updated according to energy, and then the gain value of the previous frame is set as the gain value of the current frame.

For example, in at least one embodiment of the present disclosure, the judging unit may be further configured to distinguish between the target signal and the non-target signal for the far-field speech signal of the current frame.

The gain calculation unit may be further configured to, according to a result of the distinguishing between the target signal and the non-target signal, determine a gain table calculation parameter of the far-field speech signal of the current frame, and obtain a gain variation of the far-field speech signal of the current frame relative to a previous frame.

The gain table updating unit may be further configured to determine a gain value for the far-field speech signal of the current frame according to the gain variation.

The amplification processing unit may also be configured to process the far-field speech signal of the current frame according to the determined gain value to obtain a processed speech signal.

For example, the first judging sub-unit may be configured to determine a probability that the far-field speech signal of the current frame is a voice signal, and judge whether the far-field speech signal of the current frame is the target signal or the non-target signal according to the probability. The target signal is the voice signal and the non-target signal is an environmental noise signal.

For example, the second judging sub-unit may be configured to judge whether a signal collected by each microphone in the current frame is the target signal or the non-target signal, according to a ratio of an energy of the signal collected by each microphone in the far-field speech signal of the current frame to a whole signal energy. The target signal is a target speech signal and the non-target signal comprises at least one of the following: an interference speech signal or an interference non-speech signal.

For example, the third judging sub-unit may be configured to judge whether the far-field speech signal of the current frame is the target signal or the non-target signal, according to a double-talk judgment result in an acoustic echo cancellation calculation process of the far-field speech signal of the current frame. The target signal is a near-end speech signal and the non-target signal is a far-end speech signal.

For a detailed description of the operations performed by the first judging sub-unit, the second judging sub-unit, and the third judging sub-unit, reference may be made to the above detailed description of the steps of the automatic gain control method, which will not be repeated here again.

For example, in at least one embodiment of the present disclosure, the gain calculation unit may be further configured to: in a case where the far-field speech signal of the current frame is judged as the target signal, determine that the gain table calculation parameter of the far-field speech signal of the current frame takes a maximum gain value; and in a case where the far-field speech signal of the current frame is judged as the non-target signal, determine that the gain table calculation parameter of the far-field speech signal of the current frame takes a minimum gain value.

For example, in at least one embodiment of the present disclosure, the gain table updating unit is further configured to: in a case where the gain variation is greater than a predetermined threshold, determine the gain value for the far-field speech signal of the current frame according to a gain table; otherwise, use a gain value of the previous frame as the gain value for the far-field speech signal of the current frame.

Figure 7:
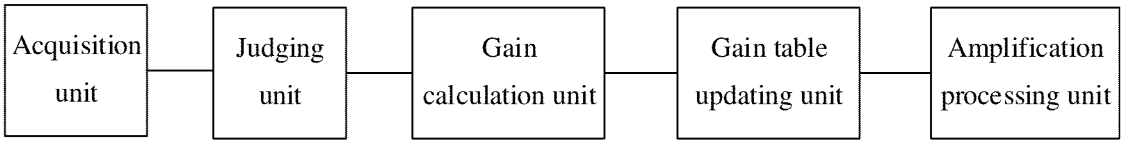
FIG. 7 is a schematic block diagram of an automatic gain control apparatus according to at least one embodiment of the present disclosure.

FIG. 7 is a schematic block diagram of an automatic gain control apparatus according to at least one embodiment of the present disclosure. As shown in FIG. 7, in addition to the above-described judging unit, gain calculation unit, gain table updating unit and amplification processing unit, the automatic gain control apparatus according to at least one embodiment of the present disclosure may further include an acquisition unit. The acquisition unit is configured to acquire a far-field speech signal. For detailed descriptions of the judging unit, the gain calculation unit, the gain table updating unit, and the amplification processing unit, reference may be made to the various embodiments described above in conjunction with FIG. 5, which will not be repeated here.

In at least one embodiment, the acquisition unit may include a signal interface to receive a predetermined far-field speech signal.

Figure 8:
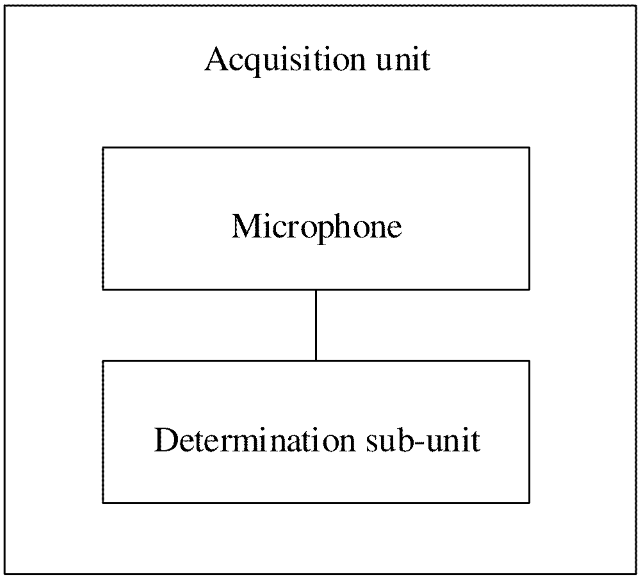
FIG. 8 is a schematic block diagram of an acquisition unit according to at least one embodiment of the present disclosure.

FIG. 8 is a schematic block diagram of an acquisition unit according to at least one embodiment of the present disclosure. As shown in FIG. 8, in at least one embodiment, the acquisition unit may further include a microphone and a determination sub-unit, the microphone is used to collect the audio signal, and the determination sub-unit is used to determine the far-field speech signal from the audio signal collected by the microphone. For example, the acquisition unit may include one or more microphones. In a case where the acquisition unit includes a plurality of microphones, the plurality of microphones may be arranged in an array to constitute a microphone array. For example, the plurality of microphones may be positioned to face different directions.

Figure 9:
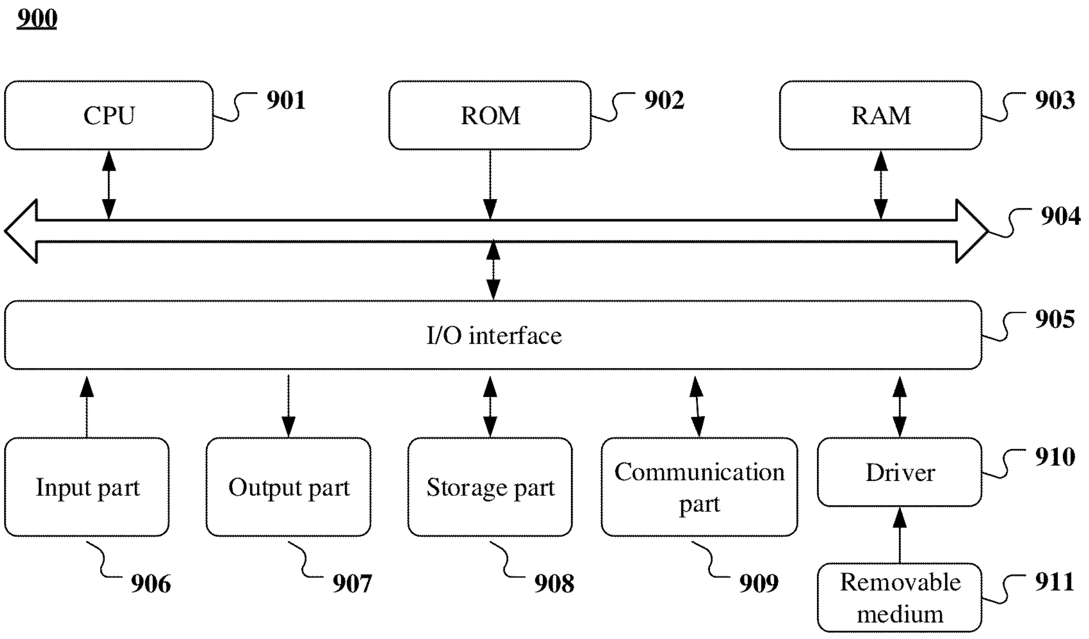
FIG. 9 is a schematic block diagram of an exemplary computer system suitable for implementing an automatic gain control method or apparatus according to at least one embodiment of the present disclosure.

FIG. 9 is a schematic block diagram of an exemplary computer system 900 suitable for implementing an automatic gain control method or apparatus according to at least one embodiment of the present disclosure. As shown in FIG. 9, a computer system 900 includes a central processing unit (CPU) 901, the central processing unit 901 may perform various appropriate actions and processes according to programs stored in a read-only memory (ROM) 902 or programs loaded from a storage portion 908 into a random access memory (RAM) 903. In the RAM 903, various programs and data required for the operation of the system 900 are also stored. The CPU 901, the ROM 902, and the RAM 903 are connected to each other through a bus 904. An input/output (I/O) interface 905 is also connected to the bus 904.

The following components are connected to the I/O interface 905: an input part 906 including a keyboard, a mouse, a microphone, or the like; an output part 907 including a cathode ray tube (CRT), a liquid crystal display (LCD), a loudspeaker, or the like; a storage part 908 including a hard disk or the like; and a communication part 909 including a network interface card such as a LAN card, a modem, and the like. The communication part 909 performs communication processing via a network such as the Internet. A driver 910 is also connected to the I/O interface 905 as required. A removable medium 911, such as a magnetic disk, an optical disk, a magneto-optical disk, a semiconductor memory, etc., is installed on the driver 910 as required, so that a computer program read from the removable medium 911 may be installed into the storage part 908 as required.

Particularly, the method according to any embodiment of the present disclosure may be implemented as a computer software program. For example, embodiments of the present disclosure include a computer program product including a computer program tangibly embodied on a machine-readable medium. The computer program includes program codes for executing the method according to any of the embodiments of the present disclosure. In such an embodiment, the computer program may be downloaded and installed from the network through the communication part 909, and/or installed from the removable medium 911.

The flowcharts and block diagrams in the accompanying drawings illustrate the architecture, function, and operation of possible implementations of the system, method, and computer program product according to various embodiments of the present disclosure. In this regard, each block in the flowchart or block diagram may represent a module, a program segment, or a part of code, the module, the program segment, or the part of code includes one or more executable instructions for implementing specified logical functions. It should also be noted that in some alternative implementations, the functions marked in the blocks may also occur in a different order from those noted in the drawings. For example, two blocks shown in succession may actually be executed substantially in parallel, and these blocks may sometimes be executed in the reverse order, depending on the functions involved. It should also be noted that each block in the block diagram and/or flowchart and the combination of the blocks in the block diagram and/or flowchart may be implemented by a dedicated hardware-based system that performs the specified functions or operations, or can by implemented by a combination of dedicated hardware and computer instructions.

In addition, although the computer system 900 is shown as a single system in the figure, it can be understood that the computer system 900 may also be a distributed system and may also be arranged as a cloud facility (including a public cloud or a private cloud). Therefore, for example, several devices may communicate through a network connection and may jointly perform tasks described as being performed by the computer system 900.

The functions described herein (including but not limited to the judging unit, the gain calculation unit, the gain table updating unit, the amplification processing unit, the first judging sub-unit, the second judging sub-unit, the third judging sub-unit, etc.) may be implemented in hardware, software, firmware, or any combination thereof. If the functions are implemented in software, these functions may be stored as one or more instructions or codes on a computer-readable medium or transmitted through it. Computer-readable media include computer-readable storage media. A computer-readable storage medium may be any available storage medium that may be accessed by a computer. By way of example and not limitation, such computer-readable media may include RAM, ROM, EEPROM, CD-ROM, or other optical disk storage, magnetic disk storage, or other magnetic storage devices, or any other media which may be used to carry or store the desired program code in the form of instructions or data structures and which may be accessed by a computer. In addition, the propagated signal is not included in the scope of the computer-readable storage medium. Computer readable media also includes the communication media which includes any medium that facilitates the transfer of computer programs from one place to another place. The connection may be, for example, the communication medium. For example, if the software uses coaxial cable, fiber optic cable, twisted pair, digital subscriber line (DSL), or wireless technologies such as infrared rays, radio, and microwave to transmit from web sites, servers, or other remote sources, the coaxial cable, fiber optic cable, twisted pair, DSL, or wireless technologies such as infrared rays, radio, and microwave are included in the definition of communication media. Combinations of the above should also be included within the scope of computer-readable media. Alternatively, the functions described in the embodiments of the present disclosure may be performed at least in part by one or more hardware logic components. Illustrative types of hardware logic components that may be used include, for example, Field Programmable Gate Array (FPGA), Program Specific Integrated Circuit (ASIC), Program Specific Standard Product (ASSP), System on Chip (SOC), Complex Programmable Logic Device (CPLD), etc.

At least one embodiment of the present disclosure also provides a readable storage medium, on which executable instructions are stored, and when the executable instructions are executed by one or more processor, the one or more processors are caused to adopt the automatic gain control method provided by any embodiment of the present disclosure.

The storage medium may include volatile memory, such as random-access memory (RAM). The storage medium may also include non-volatile memory, such as flash memory, hard disk drive (HDD) or solid-state drive (SSD). The storage medium may also include a combination of the above kinds of storage media.

Up to now, the embodiments of the present disclosure have been described in detail with reference to the drawings. It should be noted that the implementations not shown or described in the attached drawings or the text of the specification are all forms known to those of ordinary skill in the art, and are not described in detail. In addition, the above definitions of various elements and methods are not limited to various specific structures, shapes, or methods mentioned in the embodiments, but may be simply changed or replaced by those of ordinary skill in the art.

In addition, unless the steps are specifically described or must occur in sequence, the order of the above steps is not limited to the above list, and may be changed or rearranged according to the required design. In addition, the above embodiments may be mixed and matched with each other or with other embodiments based on design and reliability considerations, that is, the technical features in different embodiments may be freely combined to form more embodiments.

The algorithms and displays provided here are not inherently related to any particular computer, virtual system, or other device. Various general-purpose systems may also be used with the teachings herein. According to the above description, the structure required to construct this kind of system is obvious. Furthermore, the present disclosure is not directed to any particular programming language. It should be understood that the contents of the present disclosure described herein may be implemented in various programming languages, and the above description in the specific language is for the purpose of disclosing the best implementation of the present disclosure.

The present disclosure may be achieved by means of hardware including several different elements and by means of a suitably programmed computer. The various component of the embodiments of the present disclosure may be implemented in hardware, or in software modules running on one or more processors, or may be implemented in a combination thereof. It should be understood by those skilled in the art that a microprocessor or a digital signal processor (DSP) may be used in practice to implement some or all of the functions of some or all of the components in the related equipment according to the embodiments of the present disclosure. The present disclosure may also be implemented as an equipment or apparatus program (e.g., a computer program and a computer program product) for performing part or all of the methods described herein. Such a program implementing the present disclosure may be stored on a computer readable medium, or may have the form of one or more signals. Such signals may be downloaded from Internet websites, or provided on carrier signals, or provided in any other form.

Those skilled in the art can understand that the modules in the devices in the embodiment may be adaptively changed and set in one or more devices different from the embodiment. The modules or units or components in the embodiments may be combined into one module or unit or component, and in addition, they may be divided into a plurality of sub-modules or sub-units or sub-components. Except that at least some of such features and/or processes or units are mutually exclusive, all the features disclosed in this specification (including accompanying claims, abstract, and drawings) and all the processes or units of any method or equipment disclosed as such may be combined by any combination method. Unless explicitly stated otherwise, each feature disclosed in this specification (including accompanying claims, abstract, and drawings) may be replaced by an alternative feature that provides the same, equivalent, or similar purpose. Furthermore, in the unit claim enumerating several devices, several of these devices may be embodied by the same hardware item.

Similarly, it should be understood that, in order to simplify the present disclosure and help understand one or more of the various disclosed aspects, in the above description of exemplary embodiments of the present disclosure, various features of the present disclosure are sometimes grouped together into a single embodiment, figure, or description thereof. However, the disclosed method should not be interpreted as reflecting the following intention that the claimed disclosure requires more features than those explicitly recited in each claim. More precisely, as reflected in the following claims, the disclosed aspects lie in less than all the features of the previously disclosed single embodiment. Therefore, the claims following the specific implementation are thus explicitly incorporated into the specific implementation, each claim itself serves as a separate embodiment of the present disclosure.

The specific embodiments described above further describe the purpose, technical solutions, and beneficial effects of the present disclosure in further detail. It should be understood that the above descriptions are only specific embodiments of the present disclosure, and are not intended to limit the present disclosure. Any modifications, equivalent replacement, improvement, etc. made within the spirit and principle of the present disclosure shall be included in the protection scope of the present disclosure.

What is claimed is:

1. An automatic gain control method, comprising:

for a far-field speech signal of a current frame, distinguishing between a target signal and a non-target signal;

according to a result of the distinguishing between the target signal and the non-target signal, determining a gain table calculation parameter of the far-field speech signal of the current frame, and obtaining a gain variation of the far-field speech signal of the current frame relative to a previous frame;

determining a gain value for the far-field speech signal of the current frame according to the gain variation; and processing the far-field speech signal of the current frame according to the gain value determined, to obtain a processed speech signal;

wherein according to the result of the distinguishing between the target signal and the non-target signal, determining the gain table calculation parameter of the far-field speech signal of the current frame, and obtaining the gain variation of the far-field speech signal of the current frame relative to the previous frame, comprises:

according to the result of the distinguishing between the target signal and the non-target signal, determining the gain table calculation parameter of the far-field speech signal of the current frame;

obtaining a gain of the previous frame and a smoothing coefficient;

calculating a gain of the far-field speech signal of the current frame, according to an equation: $gain\_cur(t)=\alpha*gain\_cur(t-1)+(1-\alpha)*gain$, based on the gain table calculation parameter, the gain of the previous frame, and the smoothing coefficient; and obtaining the gain variation of the far-field speech signal of the current frame relative to the previous frame, according to an equation $\Delta gain=gain\_cur(t)-gain\_cur(t-1)$, based on the gain of the previous frame and the gain of the far-field speech signal of the current frame, where t is a count of frames, a is the smoothing coefficient, gain_cur(t−1) is the gain of the previous frame, gain_cur(t) is the gain of the far-field speech signal of the current frame, Δgain is the gain variation, and gain is the gain table calculation parameter of the far-field speech signal of the current frame;

wherein determining the gain value for the far-field speech signal of the current frame according to the gain variation, comprises:

in a case where the gain variation is greater than a predetermined threshold, determining the gain value for the far-field speech signal of the current frame according to a gain table;

otherwise in a case where the gain variation is not greater than the predetermined threshold, using a gain value of the previous frame as the gain value for the far-field speech signal of the current frame.

2. The automatic gain control method according to claim 1, wherein for the far-field speech signal of the current frame, distinguishing between the target signal and the non-target signal, comprises at least one of following operations:

determining a probability that the far-field speech signal of the current frame is a voice signal, and judging whether the far-field speech signal of the current frame is the target signal or the non-target signal according to the probability, wherein the target signal is the voice signal and the non-target signal is an environmental noise signal;

according to a ratio of an energy of a signal collected by each microphone in the far-field speech signal of the current frame to a whole signal energy, judging whether the signal collected by each microphone in the current frame is the target signal or the non-target signal, wherein the target signal is a target speech signal, and the non-target signal comprises at least one of following signals: an interference speech signal or an interference non-speech signal; or according to a double-talk judgment result in an acoustic echo cancellation calculation process of the far-field speech signal of the current frame, judging whether the far-field speech signal of the current frame is the target signal or the non-target signal, wherein the target signal is a near-end speech signal and the non-target signal is a far-end speech signal.

3. The automatic gain control method according to claim 2, wherein determining the probability that the far-field speech signal of the current frame is the voice signal, and judging whether the far-field speech signal of the current frame is the target signal or the non-target signal according to the probability, comprises:

calculating to obtain the probability that the far-field speech signal of the current frame is the voice signal, and comparing the probability with a voice threshold that is predetermined;

in a case where the probability is greater than the voice threshold, determining that the far-field speech signal of the current frame is the voice signal, otherwise in a case where the probability is not greater than the voice threshold, determining that the far-field speech signal of the current frame is the environmental noise signal.

4. The automatic gain control method according to claim 3, wherein according to the result of the distinguishing between the target signal and the non-target signal, determining the gain table calculation parameter of the far-field speech signal of the current frame, and obtaining the gain variation of the far-field speech signal of the current frame relative to the previous frame, comprises:

in a case where the far-field speech signal of the current frame is judged as the target signal, determining that the gain table calculation parameter of the far-field speech signal of the current frame takes a first gain value; and in a case where the far-field speech signal of the current frame is judged as the non-target signal, determining that the gain table calculation parameter of the far-field speech signal of the current frame takes a second gain value which is smaller than the first gain value.

5. The automatic gain control method according to claim 2, wherein according to the ratio of the energy of the signal collected by each microphone in the far-field speech signal of the current frame to the whole signal energy, judging whether the signal collected by each microphone in the current frame is the target signal or the non-target signal, comprises:

in a case where a ratio of an energy of a signal collected by one microphone to the whole signal energy is a maximum value among ratios of energies of signals collected by all microphones in the far-field speech signal of the current frame respectively to the whole signal energy or greater than a predetermined threshold, determining that the signal collected by the one microphone is the target signal, otherwise in a case where the ratio of the energy of the signal collected by the one microphone to the whole signal energy is not the maximum value among the ratios of the energies of the signals collected by the all microphones in the far-field speech signal of the current frame respectively to the whole signal energy or not greater than the predetermined threshold, determining that the signal collected by the one microphone is the non-target signal.

6. The automatic gain control method according to claim 5, wherein according to the ratio of the energy of the signal collected by each microphone in the far-field speech signal of the current frame to the whole signal energy, judging whether the signal collected by each microphone in the current frame is the target signal or the non-target signal, comprises:

acquiring a state value active_on of the signal collected by the one microphone in a microphone signal processing generalized sidelobe cancellation, wherein in a case where the state value active_on=1, it indicates that the ratio of the energy of the signal collected by the one microphone to the whole signal energy is the maximum value among the ratios of the energies of the signals collected by the all microphones in the far-field speech signal of the current frame respectively to the whole signal energy or greater than the predetermined threshold; in a case where the state value active_on=0, it indicates that the ratio of the energy of the signal collected by the one microphone to the whole signal energy is not the maximum value among the ratios of the energies of the signals collected by the all microphones in the far-field speech signal of the current frame respectively to the whole signal energy or not greater than the predetermined threshold.

7. The automatic gain control method according to claim 5, wherein according to the result of the distinguishing between the target signal and the non-target signal, determining the gain table calculation parameter of the far-field speech signal of the current frame, and obtaining the gain variation of the far-field speech signal of the current frame relative to the previous frame, comprises:

in a case where the signal collected by the one microphone of the far-field speech signal of the current frame is judged as the target signal, determining that the gain table calculation parameter of the signal collected by the one microphone of the far-field speech signal of the current frame takes a first gain value; and in a case where the signal collected by the one microphone of the far-field speech signal of the current frame is judged as the non-target signal, determining that the gain table calculation parameter of the signal collected by the one microphone of the far-field speech signal of the current frame takes a second gain value which is smaller than the first gain value.

8. The automatic gain control method according to claim 2, wherein according to the double-talk judgment result in the acoustic echo cancellation calculation process of the far-field speech signal of the current frame, judging whether the far-field speech signal of the current frame is the target signal or the non-target signal, comprises:

acquiring the double-talk judgment result of the far-field speech signal of the current frame in the acoustic echo cancellation calculation process of the far-field speech signal collected by a microphone;

in a case where the double-talk judgment result indicates that the far-field speech signal of the current frame comprises a near-end speech, determining that the far-field speech signal of the current frame is the near-end speech signal; and in a case where the double-talk judgment result indicates that the far-field speech signal of the current frame does not comprise the near-end speech, determining that the far-field speech signal of the current frame is the far-end speech signal.

9. A computer-readable storage medium, on which executable instructions are stored, wherein when the executable instructions are executed by one or more processors, causing the one or more processors to perform the automatic gain control method according to claim 1.

10. An automatic gain control apparatus, comprising:

a judging unit, configured to distinguish between a target signal and a non-target signal for a far-field speech signal of a current frame;

a gain calculation unit, configured to according to a result of the distinguishing between the target signal and the non-target signal, determine a gain table calculation parameter of the far-field speech signal of the current frame, and obtain a gain variation of the far-field speech signal of the current frame relative to a previous frame;

a gain table updating unit, configured to determine a gain value for the far-field speech signal of the current frame according to the gain variation; and an amplification processing unit, configured to process the far-field speech signal of the current frame according to the gain value determined to obtain a processed speech signal;

wherein the gain calculation unit is configured to:

according to the result of the distinguishing between the target signal and the non-target signal, determine the gain table calculation parameter of the far-field speech signal of the current frame;

obtain a gain of the previous frame and a smoothing coefficient;

calculate a gain of the far-field speech signal of the current frame, according to an equation: $gain\_cur(t)=\alpha*gain\_cur(t-1)+(1-\alpha)*gain$, based on the gain table calculation parameter, the gain of the previous frame, and the smoothing coefficient; and obtain the gain variation of the far-field speech signal of the current frame relative to the previous frame, according to an equation $\Delta gain=gain\_cur(t)-gain\_cur(t-1)$, based on the gain of the previous frame and the gain of the far-field speech signal of the current frame, where t is a count of frames, a is the smoothing coefficient, gain_cur(t−1) is the gain of the previous frame, gain_cur(t) is the gain of the far-field speech signal of the current frame, Δgain is the gain variation, and gain is the gain table calculation parameter of the far-field speech signal of the current frame;

the gain table updating unit is further configured to: in a case where the gain variation is greater than a predetermined threshold, determine the gain value for the far-field speech signal of the current frame according to a gain table; otherwise in a case where the gain variation is not greater than the predetermined threshold, use a gain value of the previous frame as the gain value for the far-field speech signal of the current frame.

11. The automatic gain control apparatus according to claim 10, wherein the judging unit comprises at least one of following sub-units:

a first judging sub-unit, configured to determine a probability that the far-field speech signal of the current frame is a voice signal, and judge whether the far-field speech signal of the current frame is the target signal or the non-target signal according to the probability, wherein the target signal is the voice signal and the non-target signal is an environmental noise signal;

a second judging sub-unit, configured to judge whether a signal collected by each microphone in the current frame is the target signal or the non-target signal, according to a ratio of an energy of the signal collected by each microphone in the far-field speech signal of the current frame to a whole signal energy, wherein the target signal is a target speech signal and the non-target signal comprises at least one of following signals: an interference speech signal or an interference non-speech signal; or a third judging sub-unit, configured to judge whether the far-field speech signal of the current frame is the target signal or the non-target signal, according to a double-talk judgment result in an acoustic echo cancellation calculation process of the far-field speech signal of the current frame, wherein the target signal is a near-end speech signal and the non-target signal is a far-end speech signal.

12. The automatic gain control apparatus according to claim 11, wherein the first judging sub-unit is further configured to:

calculate to obtain the probability that the far-field speech signal of the current frame is the voice signal, and compare the probability with a voice threshold that is predetermined;

in a case where the probability is greater than the voice threshold, determine that the far-field speech signal of the current frame is the voice signal, otherwise in a case where the probability is not greater than the voice threshold, determine that the far-field speech signal of the current frame is the environmental noise signal.

13. The automatic gain control apparatus according to claim 12, wherein the gain calculation unit is further configured to:

in a case where the far-field speech signal of the current frame is judged as the target signal, determine that the gain table calculation parameter of the far-field speech signal of the current frame takes a first gain value; and in a case where the far-field speech signal of the current frame is judged as the non-target signal, determine that the gain table calculation parameter of the far-field speech signal of the current frame takes a second gain value which is smaller than the first gain value.

14. The automatic gain control apparatus according to claim 11, wherein the second judging sub-unit is further configured to:

in a case where a ratio of an energy of a signal collected by one microphone to the whole signal energy is a maximum value among ratios of energies of signals collected by all microphones in the far-field speech signal of the current frame respectively to the whole signal energy or greater than a predetermined threshold, determine that the signal collected by the one microphone is the target signal, otherwise in a case where the ratio of the energy of the signal collected by the one microphone to the whole signal energy is not the maximum value among the ratios of the energies of the signals collected by the all microphones in the far-field speech signal of the current frame respectively to the whole signal energy or not greater than the predetermined threshold, determine that the signal collected by the one microphone is the non-target signal.

15. The automatic gain control apparatus according to claim 11, wherein the third judging sub-unit is further configured to:

acquire the double-talk judgment result of the far-field speech signal of the current frame in the acoustic echo cancellation calculation process of the far-field speech signal collected by a microphone;

in a case where the double-talk judgment result indicates that the far-field speech signal of the current frame comprises a near-end speech, determine that the far-field speech signal of the current frame is the near-end speech signal; and in a case where the double-talk judgment result indicates that the far-field speech signal of the current frame does not comprise the near-end speech, determine that the far-field speech signal of the current frame is the far-end speech signal.

16. The automatic gain control apparatus according to claim 10, further comprising an acquisition unit, wherein the acquisition unit is configured to acquire the far-field speech signal.

17. An automatic gain control apparatus, comprising:

a processor;

a memory, configured to store instructions, wherein when the instructions are executed by the processor, the processor is caused to perform an automatic gain control method, the automatic gain control method comprises:

for a far-field speech signal of a current frame, distinguishing between a target signal and a non-target signal;

according to a result of the distinguishing between the target signal and the non-target signal, determining a gain table calculation parameter of the far-field speech signal of the current frame, and obtaining a gain variation of the far-field speech signal of the current frame relative to a previous frame;

determining a gain value for the far-field speech signal of the current frame according to the gain variation; and processing the far-field speech signal of the current frame according to the gain value determined, to obtain a processed speech signal;

wherein according to the result of the distinguishing between the target signal and the non-target signal, determining the gain table calculation parameter of the far-field speech signal of the current frame, and obtaining the gain variation of the far-field speech signal of the current frame relative to the previous frame, comprises:

according to the result of the distinguishing between the target signal and the non-target signal, determining the gain table calculation parameter of the far-field speech signal of the current frame;

obtaining a gain of the previous frame and a smoothing coefficient;

calculating a gain of the far-field speech signal of the current frame, according to an equation: $gain\_cur(t)=\alpha*gain\_cur(t-1)+(1-\alpha)*gain$, based on the gain table calculation parameter, the gain of the previous frame, and the smoothing coefficient; and obtaining the gain variation of the far-field speech signal of the current frame relative to the previous frame, according to an equation $\Delta gain=gain\_cur(t)-gain\_cur(t-1)$, based on the gain of the previous frame and the gain of the far-field speech signal of the current frame, where t is a count of frames, a is the smoothing coefficient, gain_cur(t−1) is the gain of the previous frame, gain_cur(t) is the gain of the far-field speech signal of the current frame, Δgain is the gain variation, and gain is the gain table calculation parameter of the far-field speech signal of the current frame;

wherein determining the gain value for the far-field speech signal of the current frame according to the gain variation, comprises:

in a case where the gain variation is greater than a predetermined threshold, determining the gain value for the far-field speech signal of the current frame according to a gain table; otherwise in a case where the gain variation is not greater than the predetermined threshold, using a gain value of the previous frame as the gain value for the far-field speech signal of the current frame.

* * * * *